US008269484B2

(12) United States Patent
Mita et al.

(10) Patent No.: US 8,269,484 B2
(45) Date of Patent: Sep. 18, 2012

(54) INDUCTANCE-TYPE ROTATION ANGLE SENSOR, METHOD OF MANUFACTURING THE SAME, AND INTAKE CONTROL SYSTEM FOR ENGINE INCLUDING THE SAME SENSOR

(75) Inventors: Masahide Mita, Tochigi (JP); Kiyoshi Imai, Tochigi (JP); Yoshifumi Takita, Tochigi (JP); Toshiaki Takanashi, Tochigi (JP)

(73) Assignee: Keihin Corporation, Tokyo (JP)

( * ) Notice: Subject to any disclaimer, the term of this patent is extended or adjusted under 35 U.S.C. 154(b) by 296 days.

(21) Appl. No.: 12/592,720

(22) Filed: Dec. 1, 2009

(65) Prior Publication Data
US 2010/0155637 A1 Jun. 24, 2010

(30) Foreign Application Priority Data

Dec. 24, 2008 (JP) ................................ 2008-328395
Jul. 14, 2009 (JP) ................................ 2009-165727

(51) Int. Cl.
*G01B 7/30* (2006.01)
(52) U.S. Cl. .......... 324/207.17; 324/207.25; 324/207.16
(58) Field of Classification Search ............. 324/207.15–207.17, 207.25, 174
See application file for complete search history.

(56) References Cited

U.S. PATENT DOCUMENTS

| 7,081,746 B2 * | 7/2006 | Aoki et al. ............... 324/207.25 |
| 2004/0164728 A1 | 8/2004 | Rissing |
| 2008/0087858 A1 * | 4/2008 | Hatsuzawa et al. ...... 251/129.11 |

FOREIGN PATENT DOCUMENTS

| JP | 2008-096231 A | 4/2008 |
| JP | 2008-309598 A | 12/2008 |

* cited by examiner

*Primary Examiner* — Jay Patidar
(74) *Attorney, Agent, or Firm* — Carrier Blackman & Associates, P.C.; Joseph P. Carrier; William D. Blackman

(57) ABSTRACT

An inductance-type rotation angle sensor includes: a stator formed by printing an annularly formed magnetic conductor and a receiving conductor placed adjacent to the magnetic conductor on a glass-epoxy-resin substrate; and a rotor having an excitation conductor attached thereto in a manner opposing the magnetic conductor. In the sensor, a thermosetting-resin covering layer, which is connected together through a periphery of the substrate and a through-hole included in this substrate, is formed on both front and back surfaces of the substrate by molding; a portion of the covering layer covering the magnetic conductor and the receiving conductor is formed as a thin thickness part which is thinner in thickness than a remaining portion of the covering layer; and the stator is buried in a thermoplastic-resin control housing with the thin thickness part being exposed to an outside. Accordingly, it is possible to provide an inductance-type rotation angle sensor which is capable of restraining the change that occurs in the plate thickness of the substrate due to temperature change, and which is capable of stabilizing the detection precision of the angle change of the rotor.

7 Claims, 17 Drawing Sheets

1
INDUCTANCE-TYPE ROTATION ANGLE SENSOR, METHOD OF MANUFACTURING THE SAME, AND INTAKE CONTROL SYSTEM FOR ENGINE INCLUDING THE SAME SENSOR

BACKGROUND OF THE INVENTION

1. Field of the Invention

The present invention relates to an inductance-type rotation angle sensor including a rotor attached to a rotating body to be detected and a stator attached to an irrotational control housing, the stator formed by printing an annularly formed magnetic conductor and a receiving conductor placed adjacent to the magnetic conductor on a glass-epoxy-resin substrate, the rotor having an excitation conductor attached thereto in a manner opposing the magnetic conductor, the sensor being configured to detect from the receiving conductor change in inductance of the magnetic conductor due to rotation of the excitation conductor as change in a rotation angle of the rotating body. The invention also relates to a method of manufacturing the same, and an intake control system for an engine including the same sensor.

2. Description of the Related Art

Such an inductance-type rotation angle sensor is already known, as disclosed in Japanese Patent Application Laid-open No. 2008-96231.

In such an inductance-type rotation angle sensor, for the purpose of enhancing the detection precision of angle change of the rotating body, it is important that the opposing gap between the magnetic and receiving conductors of the stator and the excitation conductor of the rotating body should be stabilized and narrowed as much as possible. In the glass epoxy resin substrate on which the magnetic and receiving conductors are printed, due to the orientation of glass fibers therein, the coefficient of linear expansion in the plate-surface direction is extremely small, whereas the coefficient of liner expansion in the plate-thickness direction is relatively large. Accordingly, when the inductance-type rotation angle sensor is used in an environment where temperature changes extremely, like in the vicinity of an engine, the opposing gap may change due to change in thickness of the substrate, and the detection precision of angle change of the rotating body may be deteriorated. However, the conventional inductance-type rotation angle sensor is actually lacking in consideration to prevent the thickness of the substrate from changing due to temperature change.

SUMMARY OF THE INVENTION

The present invention has been made in view of the above problem being taken into consideration. An object of the present invention is to provide: an inductance-type rotation angle sensor which is capable of restraining the change that occurs in the plate thickness of the substrate due to temperature change, and which is capable of stabilizing the detection precision of the angle change of the rotating body; a method of manufacturing the rotation angle sensor; and an intake control system for an engine including the rotation angle sensor.

In order to achieve the object, according to a first feature of the present invention, there is provided an inductance-type rotation angle sensor including a rotor attached to a rotating body to be detected and a stator attached to an irrotational control housing, the stator formed by printing an annularly formed magnetic conductor and a receiving conductor placed adjacent to the magnetic conductor on a glass-epoxy-resin substrate, the rotor having an excitation conductor attached thereto in a manner opposing the magnetic conductor, the sensor being configured to detect from the receiving conductor change in inductance of the magnetic conductor due to rotation of the excitation conductor as change in a rotation angle of the rotating body, characterized in that a thermosetting-resin covering layer is formed on both front and back surfaces of the substrate by molding, the covering layer on the front and back surfaces of the substrate connected together through a periphery of the substrate and a through-hole included in the substrate, a portion of the covering layer covering the magnetic conductor and the receiving conductor is formed as a thin thickness part which is thinner in thickness than a remaining portion of the covering layer, and the stator is buried in the thermoplastic-resin control housing with the thin thickness part being exposed to an outside. Note that the rotation angle sensor corresponds to a throttle opening-degree sensor 22, which will be described later, of an embodiment of the present invention; and the rotating body corresponds to a throttle valve 3.

According to the first feature of the present invention, the thermosetting-resin covering layer on the front and the back of the substrate can cooperately restrain thermal expansion of the substrate in the plate-thickness direction. In addition, because the thin thickness part of the covering layer covering the magnetic conductor is thinner in thickness than a remaining portion of the covering layer, it is possible to narrow an opposing gap between the magnetic conductor and the excitation conductor of the rotor. Furthermore, even if ambient temperature changes, it is possible to prevent change in the opposing gap between the magnetic conductor of the stator and the excitation conductor of the rotor, or to keep the change to a minimum. Accordingly, it is possible to enhance and stabilize the rotation angle detection precision of the inductance-type rotation angle sensor.

Further, according to a second feature of the present invention, in addition to the first feature, the covering layer is formed of a thermosetting resin whose coefficient of linear expansion is smaller than that of the substrate in its plate-thickness direction.

According to the second feature of the present invention, it is possible to more effectively restrain the thermal expansion of the substrate in the plate-thickness direction by forming the covering layer of the thermoplastic resin whose coefficient of linear expansion is smaller than the coefficient of linear expansion of the glass epoxy resin of the substrate in the plate-thickness direction.

Further, according to a third feature of the present invention, in addition to the first feature, a plurality of bus bars are respectively connected to bus bar connectors on the substrate, the bus bars having coupler terminals formed at one end parts, respectively, the bus bar connectors are buried in the covering layer, and a coupler configured to hold the coupler terminals is formed integrally in the control housing.

According to the third feature of the present invention, it is possible to prevent the bus bars and the substrate from having a poor connection therebetween and from being short-circuited together due to moisture infiltration by burying, in the covering layer, the connecters of the bus bars with the substrate, each of the bus bars having the one end portion formed as the coupler terminal. In addition, it is possible to hold the substrate and the coupler terminals at the time when the control housing is formed by molding. Accordingly, it is possible to simplify the structure.

Further, according to a fourth feature of the present invention, there is provided a method of manufacturing the inductance-type rotation angle sensor according to the first feature, wherein when the thermosetting-resin covering layer covering both the front and back surfaces of the substrate is formed by setting the stator between a stationary mold and a movable mold for forming a covering layer, and by subsequently filling a thermosetting resin into a cavity formed between the stationary mold and the movable mold, integrally connecting the plurality of bus bars together by tie bars in an area close to an outer side edge of the substrate while forming tabs respectively in outermost bus bars, the tabs being aligned with the tie bars and protruding laterally outward; forming holding grooves configured to loosely accommodate the bus bars, the tie bars and the tabs in one of the stationary mold and the movable mold; when the stationary mold and the movable mold are closed with the stator being set between the two molds, bringing the two molds into intimate contact with the respective both surfaces of each of the bus bars and the tie bars, and crushing the tabs to fill in gaps between the tabs and inner side surfaces of holding grooves opposed to the tabs, respectively; and subsequently, when the thermosetting resin is filled into the cavity, blocking the resin from flowing out from the cavity to the holding grooves by the tie bars and the tabs. Note that the tie bar corresponds to a first tie bar 36, which will be described later, of an embodiment of the present invention.

According to the fourth feature of the present invention, it is possible for the tie bars with the tabs to block the flow of the thermosetting resin even if, as molding flashes, the thermosetting resin flows out to the gap between the base of each bus bar and the inner side walls of a corresponding one of the holding grooves while the thermosetting resin is filled into the cavity. Accordingly, it is possible to prevent the thermosetting resin from flowing beyond the tie bars, and to keep the formation of molding flashes to a minimum.

Further, according to a fifth feature of the present invention, there is provided a method of manufacturing the inductance-type rotation angle sensor according to the first feature, wherein when the thermosetting-resin covering layer covering both the front and back surfaces of the substrate is formed by setting the stator between a stationary mold and a movable mold for forming a covering layer, and by subsequently filling a thermosetting resin into a cavity formed between the stationary mold and the movable mold, providing paired tabs to outer side surfaces of each of the plurality of bus bars in an area close to an outer side edge of the substrate in a manner protruding in a direction in which these bus bars are arranged side by side, while forming holding grooves configured to loosely accommodate the bus bars and the tabs in one of the stationary mold and the movable mold; when the stationary mold and the movable mold are closed with the stator being set between the two molds, bringing the two molds into intimate contact with the respective both surfaces of each of the bus bars, and crushing the tabs to fill in gaps between the tabs and inner side surfaces of the holding grooves, respectively; and subsequently, when the thermosetting resin is filled into the cavity, blocking the resin from flowing out from the cavity to the holding grooves by the tabs.

According to the fifth feature of the present invention, it is possible for the tabs to block the thermosetting resin flowing out from the cavity to the bases of the respective bus bars while the thermosetting resin is filled into the cavity. Accordingly, it is possible to keep the formation of molding flashes to a minimum.

Further, according to a sixth feature of the present invention, there is provided an intake control system for an engine which is equipped with an inductance-type rotation angle sensor, the system comprising: a throttle body including an intake barrel having an intake passage, the intake barrel supporting a valve shaft of a throttle valve for opening and closing the intake passage, and the control housing continuously provided to a side of the intake barrel; an electric motor housed in the control housing and configured to drive the throttle valve to open and close; a deceleration gear mechanism configured to transmit a rotation of the electric motor to the valve shaft while reducing a speed of the rotation; and a throttle opening-degree sensor configured to detect an opening-degree of the throttle valve, in which the throttle opening-degree sensor is configured of the inductance-type rotation angle sensor according to the first feature, wherein a final follower gear of the deceleration gear mechanism is fixed to an end portion of the valve shaft by a nut screwed to the end portion, a tool engagement part configured to engage with a tool for turning the nut is formed in an outer end portion of the nut, the rotor is fixed to an outer periphery of the outer end portion of the nut, the rotor made of a synthetic resin and having a tubular shape with a hollow part for enabling insertion and removal of the tool, the excitation conductor is attached to an end portion of the rotor, the stator is fixed to the control housing in a manner opposing to the rotor with a gap therebetween, and configured to detect an opening-degree of the throttle valve in cooperation with the rotor, and the rotation angle sensor is formed of the rotor, the excitation conductor and the stator. Note that the final follower gear corresponds to a secondary follower gear 14, which will be described later, of an embodiment of the present invention; and the tool engagement part corresponds to a socket 18a.

According to the sixth feature of the present invention, the synthetic resin rotor configured to hold the excitation conductor of the throttle sensor, namely the inductance-type rotation angle sensor, is fixed to the outer periphery of the outer end portion of the nut for fixing the final follower gear of the deceleration gear mechanism to the end portion of the valve shaft. Accordingly, it is possible to change the features of the rotation angle sensor by only replacing the excitation conductor and the rotor as a small component part holding the excitation conductor. Thus, the change can be performed at low cost.

Furthermore, the rotor is of a tubular shape and has the hollow part for enabling insertion and removal of the tool for turning the nut. Accordingly, it is possible to easily and securely screw the nut to the valve shaft by the tool without any obstruction by the rotor and unnecessary load being imposed on the rotor.

Further, according to a seventh feature of the present invention, in addition to the sixth feature, the nut and the excitation conductor are buried in and connected to opposite end portions of the rotor, respectively, so that the nut, the excitation conductor, and the rotor are constructed as a single part.

According to the seventh feature of the present invention, the nut and the excitation conductor are buried in and connected to opposite end portions of the rotor, respectively, so that the nut, the excitation conductor, and the rotor are constructed as a single part. Accordingly, it is possible to set the rotor in the fixed position at the time when the final follower gear is attached to the valve shaft by the nut. This makes an attachment step exclusively for the rotor no longer necessary, and accordingly contributes to enhancing the assembly efficiency.

The above, other objects, characteristics and advantages of the present invention will be clear from detailed descriptions which will be provided for the preferred embodiment referring to the attached drawings.

DESCRIPTION OF THE PREFERRED EMBODIMENTS

Preferred embodiments of the present invention will be described below with reference to the attached drawings.

Figure 1:
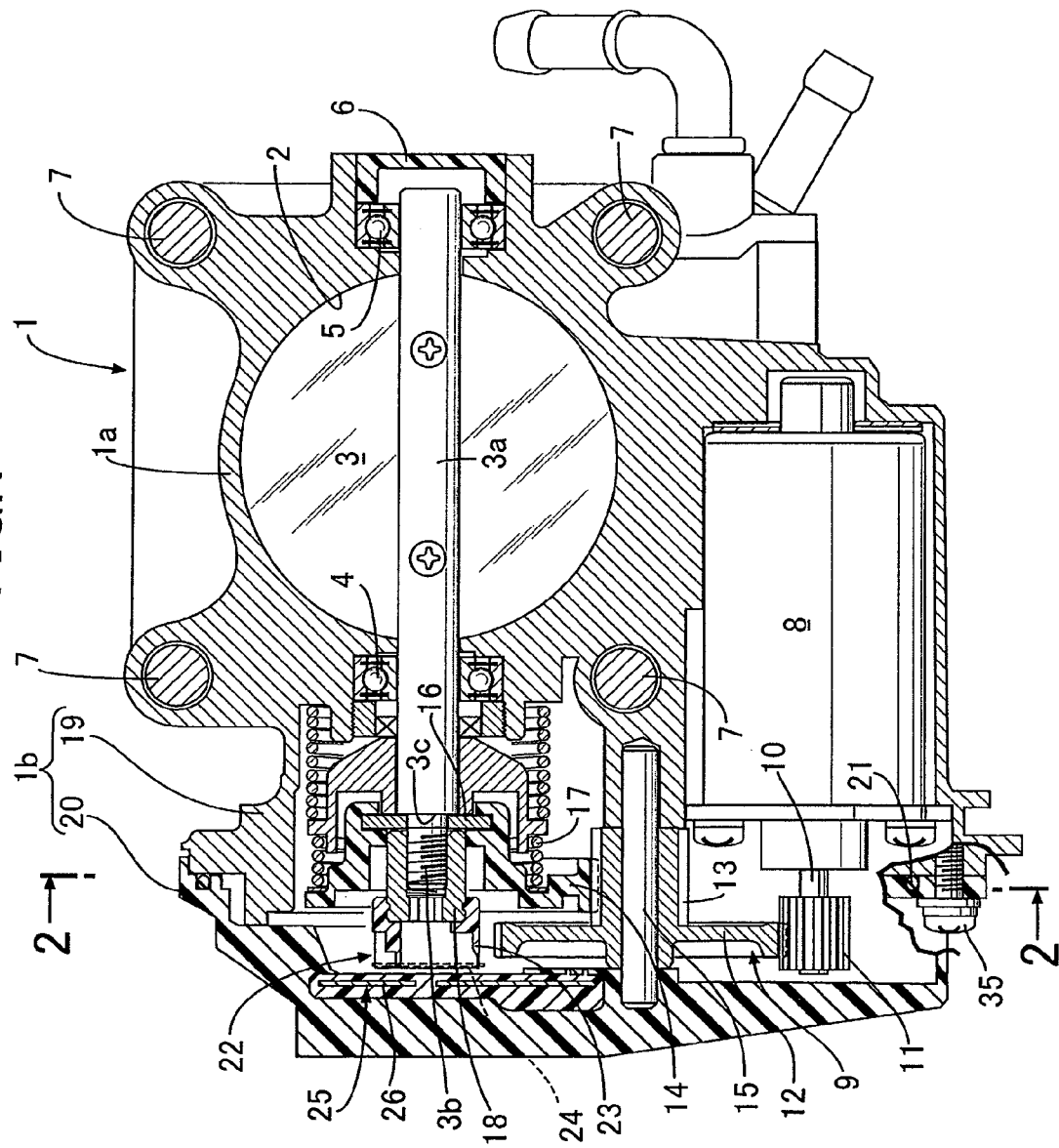
FIG. 1 is a cross-sectional view of an engine intake control system including a throttle opening-degree sensor according to the present invention.
Figure 2:
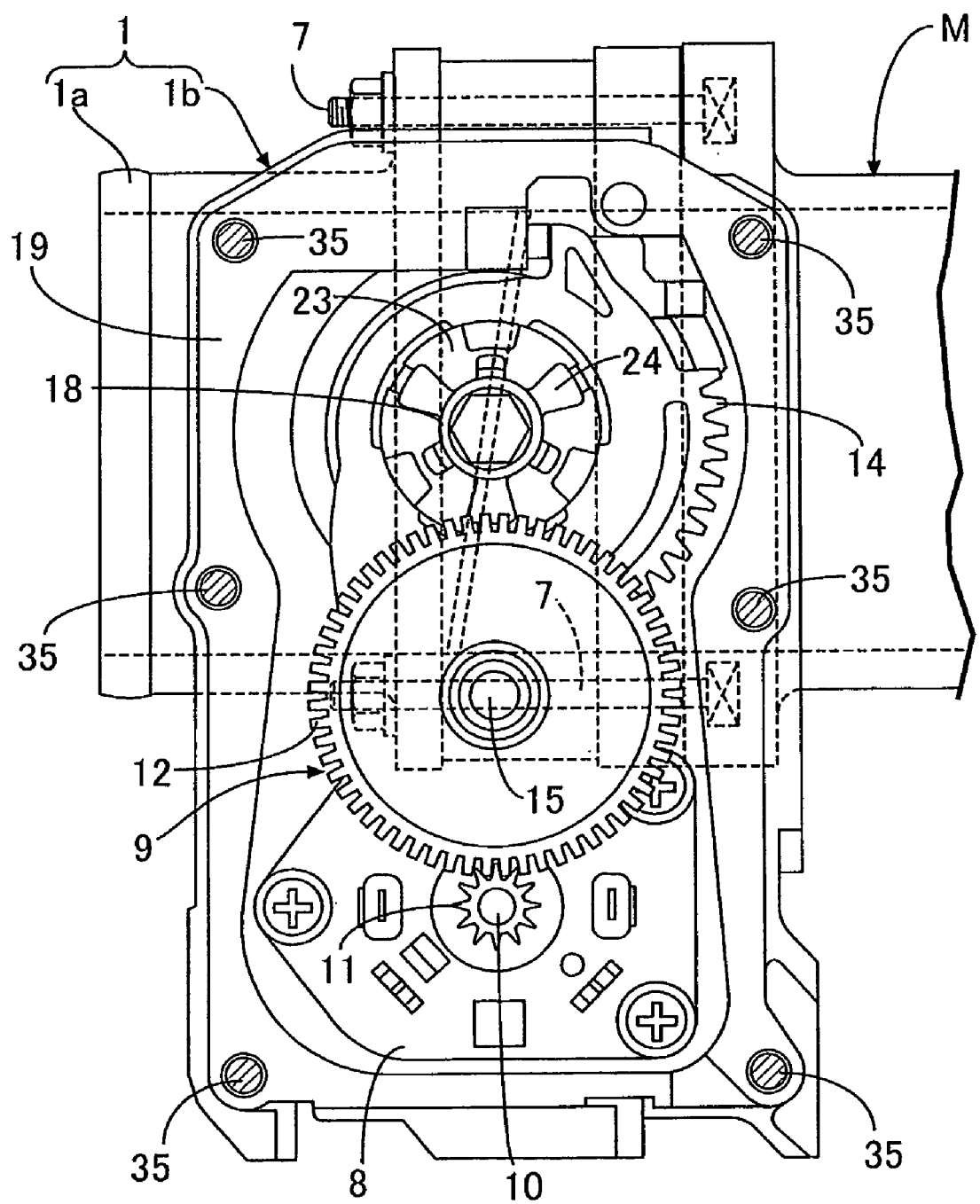
FIG. 2 is a cross-sectional view taken along line 2-2 in FIG. 1.

In FIGS. 1 and 2, a throttle body 1 is attached to an intake manifold M of an engine for vehicles such as motorcycles and automobiles by multiple bolts 7. This throttle body 1 includes: an intake barrel 1a having an intake passage 2 in its inside; and a control housing 1b being continuous with this intake barrel 1a at a portion from a lateral side to a lower portion of the intake barrel 1a. A throttle valve 3 configured to open and close the intake passage 2 is attached to the intake barrel 1a in a way that a valve shaft 3a of the throttle valve 3 is rotatably supported by the left and right sidewalls of the intake barrel 1a with bearings 4, 5 interposed in between.

A cap 6 covering an outer end of the right end portion of the valve shaft 3a and the bearing 5 is fitted into the right sidewall of the throttle body 1. The left end portion of the valve shaft 3a projects outward from the left sidewall of the throttle body 1. An electric motor 8 configured to drive the throttle valve 3 to open and close is connected to the projecting end portion of the valve shaft 3a with a deceleration gear mechanism 9 interposed in between.

The deceleration gear mechanism 9 includes: a primary drive gear 11 fixed to an output shaft 10 of the electric motor 8; a primary follower gear 12 which is rotatably supported by an intermediary shaft 15, and which meshes with the primary drive gear 11; a secondary drive gear 13 integrally formed in an side of this primary follower gear 12; and a sector-type secondary follower gear 14 which is fixed to the left end portion of the valve shaft 3a, and which meshes with the secondary drive gear 13. The deceleration gear mechanism 9 is configured to be capable of opening and closing the throttle valve 3 by transmitting the rotation of the output shaft 10 of the electric motor 8 to the valve shaft 3a while reducing its rotation speed in two stages. Each gear included in the deceleration gear mechanism 9 is a spur gear. The valve shaft 3a, the output shaft 10 and the intermediary shaft 15 are arranged in a way that their respective axes are orthogonal to an axis of the intake passage 2, and their axes are arrayed in parallel to one another. A close spring 17 made of a twisted coil spring is connected to the secondary follower gear 14, the close spring 17 biasing the secondary follower gear 14 in a direction closing the throttle valve 3.

The control housing 1b includes: a housing body 19 formed integrally with the intake barrel 1a: and a synthetic-resin housing cover 20 connected to an opened surface of this housing body 19 by multiple screws 35. Respective connecting surfaces of the housing body 19 and the housing cover 20 are orthogonal to the axis of the valve shaft 3a. A seal member 21 is inserted between these connecting surfaces. The electric motor 8 is housed inside a lower portion of the housing body 19. The deceleration gear mechanism 9 is housed inside the housing cover 20 and the housing body 19. The two end portions of the intermediary shaft 15 are supported by the housing body 19 and the housing cover 20, respectively.

An inductance-type throttle opening-degree sensor 22 configured to detect an opening-degree of the throttle valve 3 is configured between the throttle shaft 3a of the throttle valve 3 and the housing cover 20. Next, descriptions will be provided for a configuration of this throttle opening-degree sensor 22 and its surrounding area.

In FIGS. 1 and 7 to 10, a screw shaft 3b whose diameter is smaller than that of valve shaft 3a is formed continuous with the left end portion of the valve shaft 3a in an manner integral with an annular step part 3c being interposed therebetween. The cross-section of this screw shaft 3b is a quasi-oval shape by evenly cutting off its two opposing side portions (see FIG. 8). On the other hand, a boss of the synthetic-resin secondary follower gear 14 has a metal annular attachment plate 16 buried in an inner peripheral side of the boss to be integral with the boss. An attachment hole 14a having a quasi-oval cross-section similar to the screw shaft 3b is provide in a center portion of this attachment plate 16. The attachment plate 16 is held and fixed between the annular step part 3c and a nut 18 by: inserting the screw shaft 3b into this attachment hole 14a; and thereafter screwing and fastening the nut 18 to a front end portion of the screw shaft 3b. A polygonal socket 18a (a hexagonal socket in the illustrated example), which is capable of engaging with a polygonal wrench for its turning operation, is formed in an inner periphery of the outer end portion of the nut 18. A synthetic-resin rotor 23 is fixed to an outer periphery of the outer end portion of the nut 18.

This rotor 23 is tubular, and has a hollow part 23a which enables insertion and removal of the wrench. An excitation conductor 24 is buried in and bonded to the outer end portion of this rotor 23. The rotor 23, the excitation conductor 24 and the nut 18 are bonded together by insert-molding the synthetic resin of the rotor 23, and accordingly constitute a single component.

Figure 9:
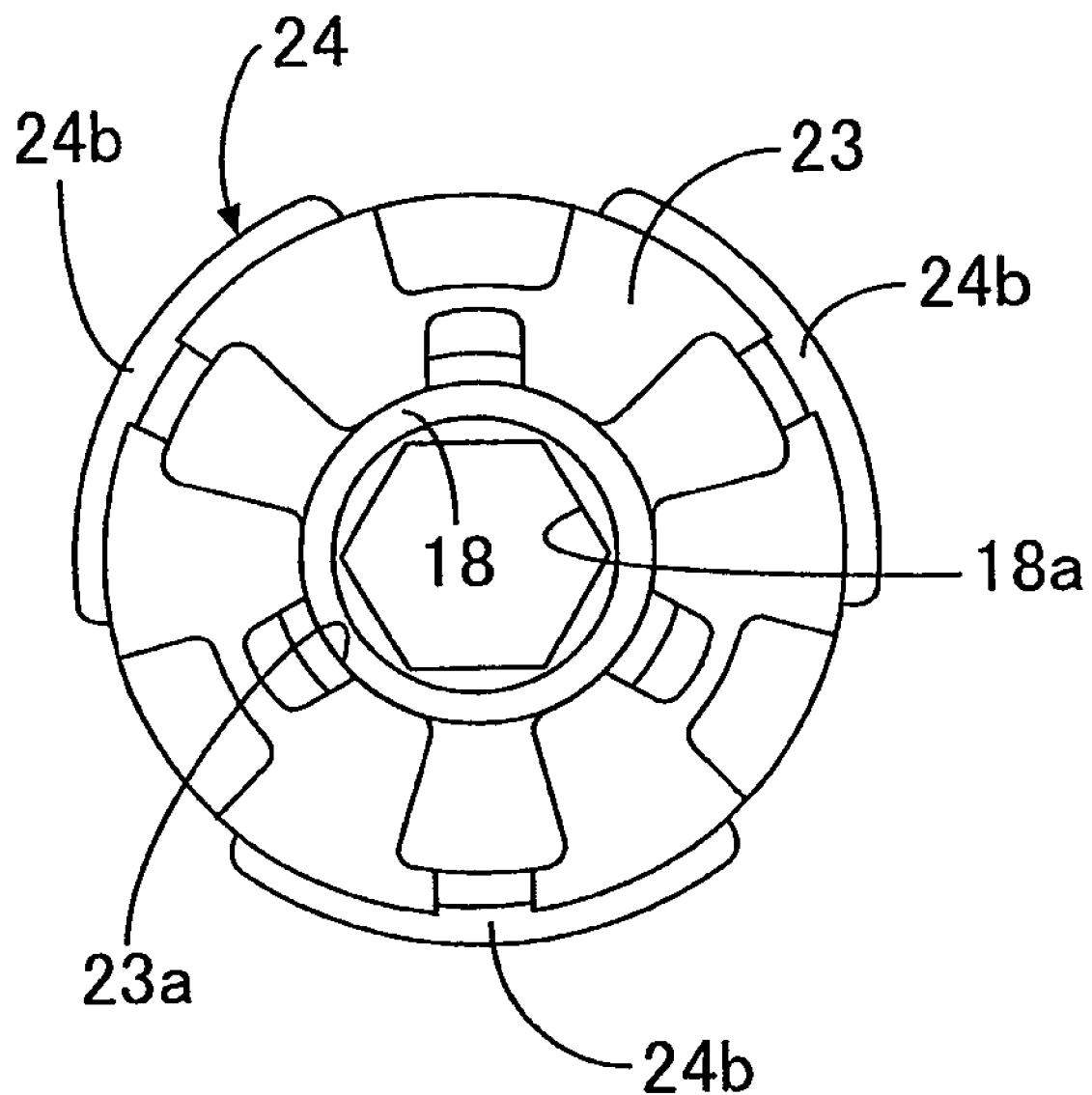
FIG. 9 is a view seen from a direction of arrow 9 in FIG. 7.
Figure 10:
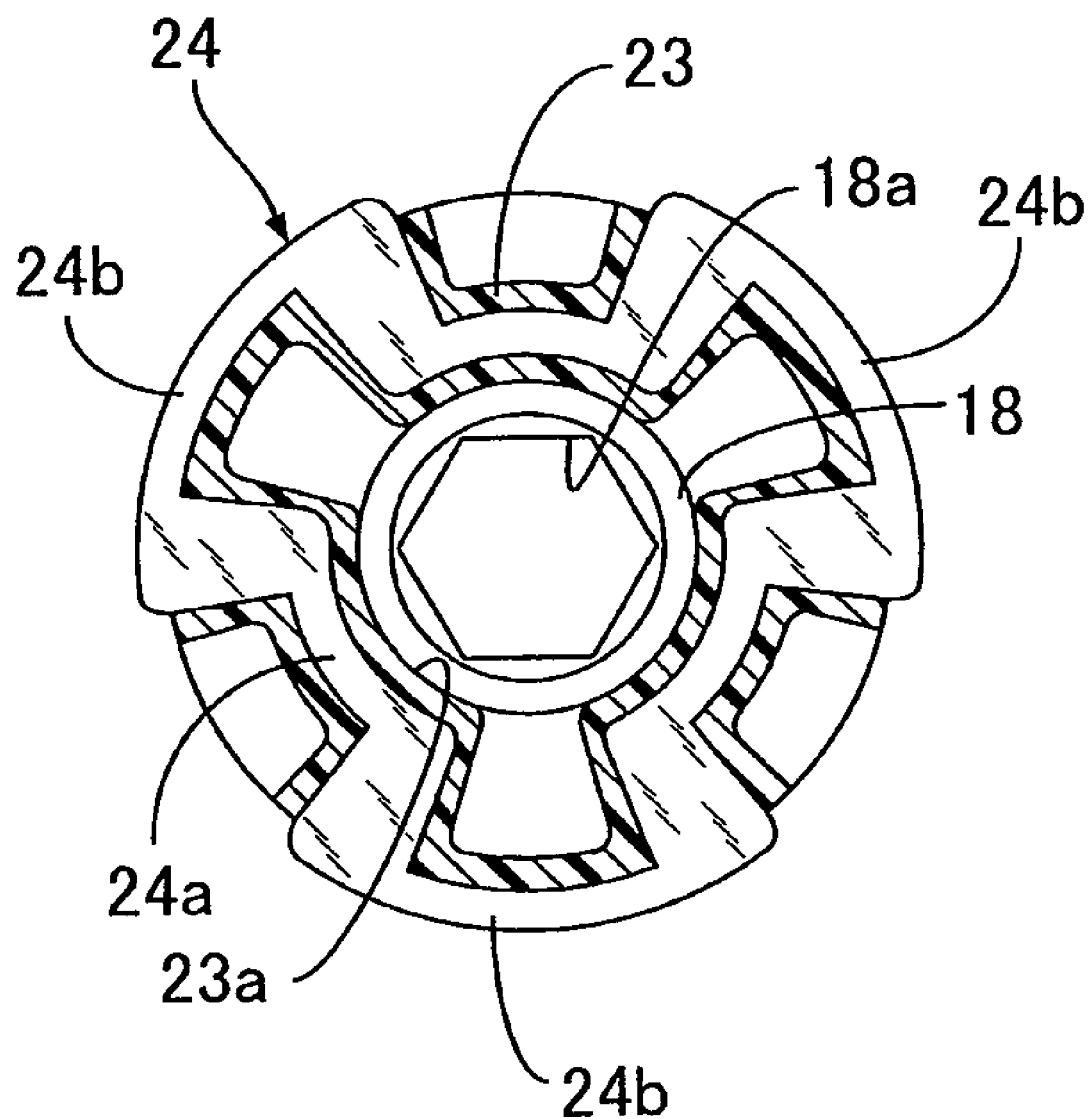
FIG. 10 is a cross-sectional view taken along line 10-10 in FIG. 7.

As shown in FIGS. 9 and 10, the excitation conductor 24 includes three blades 24b which extend radially from an annular core part 24*a*. The front end portion of each blade 24*b* slightly protrudes from the outer peripheral surface of the rotor 23.

As shown in FIGS. 1 and 3 to 6, a stator 25 of the throttle opening-degree sensor 22 is configured by: printing an annular magnetic conductor 27 and an annular receiving conductor 28 arranged adjacent to and inside the magnetic conductor 27 on the top surface of a glass-epoxy-resin substrate 26; and also packaging paired microcomputers 29, 29' on the undersurface of the substrate 26. The magnetic conductor 27 is placed opposed to the excitation conductor 24 of the rotor 23 with a space therebetween. An electric current is supplied to the magnetic conductor 27 from a power supply, and a three-phase alternating current waveform is generated in the receiving conductor 28 by a change in an inductance of the magnetic conductor 27, the change occurring due to rotation of the excitation conductor 24 of the rotor 23. The computers 29, 29' process the alternating current waveform, and outputs a signal corresponding to a rotation angle of the valve shaft 3*a* to which the rotor 23 is attached, namely an opening-degree of the throttle valve 3, to an electronic control unit (not illustrated) controlling the operation of the electric motor 8.

Four bus bars 30*a* to 30*d* projecting side by side outward from the periphery of the substrate 26 are respectively soldered to bus bar connectors 33*a* to 33*d* concentratedly arranged in a corner portion of the substrate 26. The outer ends of these bus bars 30*a* to 30*d* are formed as coupler terminals 31*a* to 31*d*, respectively. Out of these coupler terminals 31*a* to 31*d*, two coupler terminals 31*a*, 31*c* are used to be connected to the power supply, and the two other coupler terminals 31*b*, 31*d* are used to output the rotation angle signals.

A thermosetting-resin covering layer 32 is formed on both front and back of the substrate 26 by molding, the covering layer 32 on the front and back of the substrate 26 being connected together through a periphery of the substrate 26, a through-hole 34 (see FIGS. 3 and 4) and numerous through-holes for inserting wires. The magnetic conductor 27, the receiving conductor 28, the microcomputers 29, 29', as well as the connection parts between the bus bars 30*a* to 30*d* and the substrate 26, are all buried in this covering layer 32. This makes it possible to prevent poor connection of the wires and the wires from being electrically short-circuited due to moisture infiltration on the substrate 26. In this respect, a portion of the covering layer 32 covering the magnetic conductor 27 and the receiving conductor 28 is formed as a thin thickness part 32*a* which is thinner in thickness than a remaining portion of the covering layer 32.

The connection of portions of the covering layer 32 on the front and the back of the substrate 26 through the through-hole 34 of the substrate 26 means that the portions of the covering layer 32 on the front and the back of the substrate 26 are integrally connected together by the thermosetting resin filled in the through-hole 34. The through-hole 34 is provided in the center portions of the magnetic conductor 27 and the receiving conductor 28.

The stator 25 including the substrate 26 having the covering layer 32 formed therearound is buried in the thermoplastic-resin housing cover 20 when the housing cover 20 is formed by molding. During the molding, the thin thickness part 32*a* is exposed from the housing cover 20 in order that the magnetic conductor 27 can be opposed to the excitation conductor 24 of the rotor with the thin thickness part 32*a* being interposed in between. A coupler 20*a* is integrally formed in the housing cover 20, the coupler 20*a* configured to house and hold the coupler terminals 31*a* to 31*d* formed in the front ends of the bus bar 30*a* to 30*d* and power supplying coupler terminals 52*a*, 52*b* for the electric motor 8. Accordingly, the substrate 26 and the coupler terminals 31*a* to 31*d* can be hold once the housing cover 20 is formed. This makes it possible to simplify the structure.

As a glass epoxy resin, which is a component material of the substrate 26, a material is used whose coefficients of linear expansion are 12 PPM/degree to 14 PPM/degree in the plate surface direction and 35 PPM/degree in the plate-thickness direction. A reason why the coefficients of linear expansion of the glass epoxy resin of the substrate 26 are smaller in the plate surface direction and larger in the plate-thickness direction is that glass fibers compounded with the epoxy resin are oriented in the surface direction of the substrate 26 at the time of formation of the substrate 26.

On the other hand, as a thermosetting resin, which is a component material of the covering layer 32, a material is used whose coefficients of linear expansion are 16 PPM/degree. In sum, it is important that the coefficient of linear expansion of the thermosetting resin for the covering layer 32 should be smaller than that of the glass epoxy resin for the substrate 26 in the plate-thickness direction.

In this manner, the thermosetting-resin covering layer 32 whose portions are connected together through the periphery of the glass-epoxy-resin substrate 26 and the through-hole 34, is formed on the front and back of the substrate 26 by molding. For this reason, the thermosetting-resin covering layer 32 on the front and back of the substrate 26 can cooperately restrain thermal expansion of the substrate 26 in the plate-thickness direction.

Particularly because the covering layer 32 is formed of the thermosetting resin whose coefficient of linear expansion is smaller than that of the glass epoxy resin of the substrate 26 in the plate-thickness direction, it is possible to restrain the thermal expansion of the substrate 26 in the plate-thickness direction more effectively. Furthermore, because the thickness of the covering layer 32 is thinner in the thin thickness part 32*a* covering the magnetic conductor 27 and the receiving conductor 28 than in a remaining portion of the covering layer 32, it is possible to narrow the opposing gap between the magnetic and receiving conductors 27, 28 and the excitation conductor 24 of the rotor 23. In addition, it is possible to prevent or minimize change in the opposing gap between the magnetic conductor 27 of the stator 25 and the excitation conductor 24 of the rotor 23 even if the covering layer 32 is influenced by change in the ambient temperature. Accordingly, it is possible to enhance and stabilize the opening-degree detection precision of the inductance-type throttle opening-degree sensor 22. Moreover, because the through-hole 34 of the substrate 26 is provided in the center portion of the magnetic conductor 27 covered with the thin thickness part 32*a* of the covering layer 32, it is possible to effectively reinforce the thin thickness part 32*a* with the thermosetting resin filled in the through-hole 34. Thus, it is possible to restrain the thermal expansion of the substrate 26 in the plate-thickness direction in the surrounding portion of the magnetic conductor 27 even with this thin thickness part 32*a*.

Meanwhile, because the synthetic-resin rotor 23 holding the excitation conductor 24 is formed on the outer periphery of the outer end portion of the nut 18 with the polygonal socket 18*a*, the nut 18 fixing the secondary follower gear 14 of the deceleration gear mechanism 9 to the end portion of the valve shaft 3*a*, i.e., the screw shaft 3*b*, it is possible to change the characteristics of the throttle opening-degree sensor 22 only by replacing the excitation conductor 24 and the rotor as the small component part holding the excitation conductor 24. Accordingly, the change can be performed at low cost.

In addition, because the rotor 23 is tubular and has the hollow part 23a which enables insertion and removal of the wrench for turning the nut 18, it is possible to easily and securely screw the nut 18 to the screw shaft 3b by use of the wrench without any obstruction by the rotor 23 and unnecessary load being imposed on the rotor 23.

Furthermore, the nut 18, the excitation conductor 24, and the rotor 23 are formed as a single part in such a manner that the nut 18 and the excitation conductor 24 are buried in and connected to the opposite end portions of the rotor 23, respectively. As a result, it is possible to set the rotor 23 in a predetermined position at the time when the secondary follower gear 14 is attached to the valve shaft 3a by the nut 18. This makes an attachment step exclusively for the rotor 23 no longer necessary, and can contribute to enhancing the assembly efficiency.

Next, descriptions will be made on a method of manufacturing the stator 25, referring to FIGS. 11 to 15.

Figure 11:
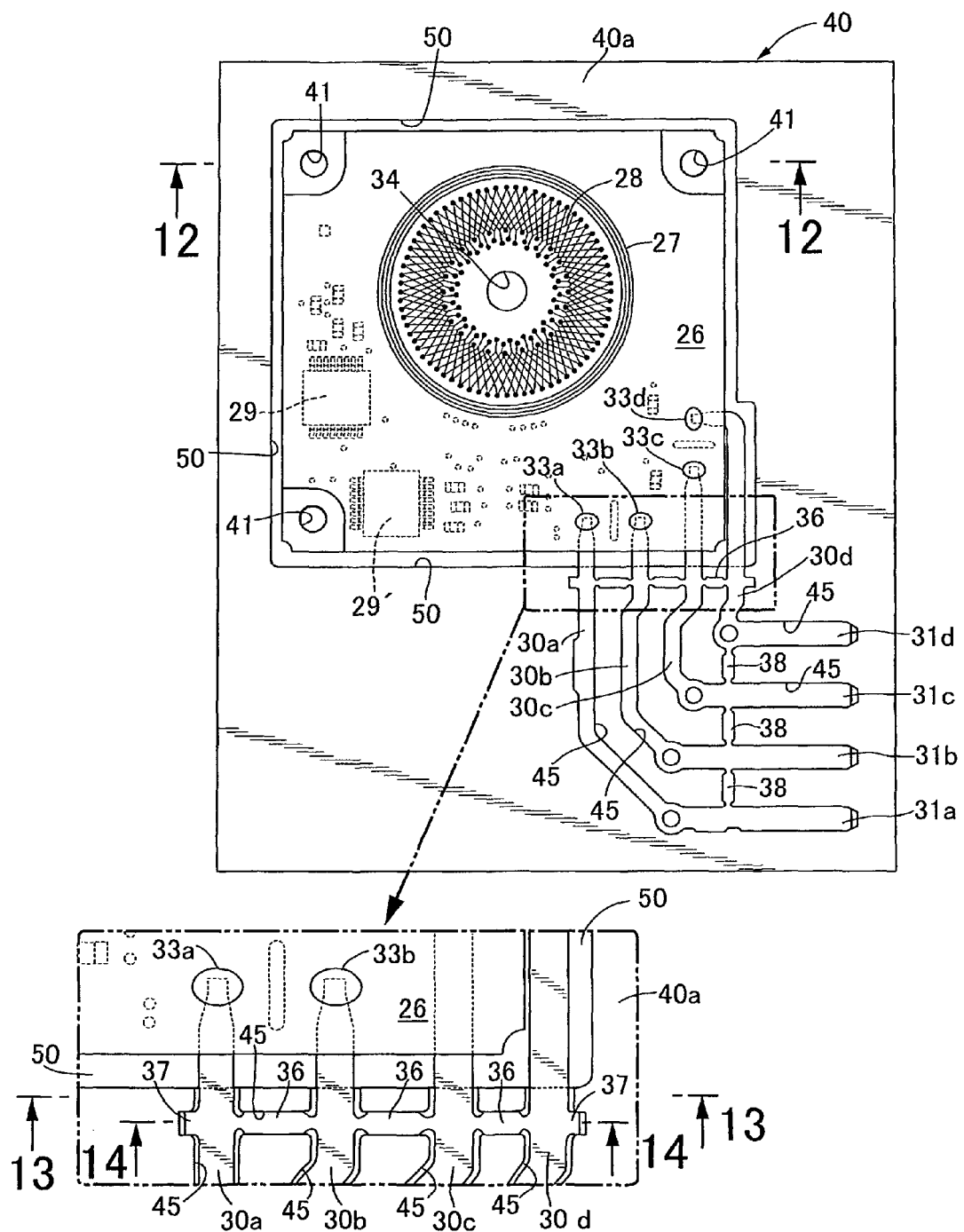
FIG. 11 is a plan view showing a state in which the stator is set on a covering layer molding die at the time of molding the covering layer to the stator.

[1] Assembly of Stator 25 (see FIG. 11)

First of all, the annularly formed magnetic conductor 27 and the receiving conductor 28 placed adjacent to and inside the magnetic conductor 27 are printed on a side surface of the glass-epoxy-resin substrate 26. In addition, the paired microcomputers 29, 29' are packaged. The substrate 26 is rectangular, and positioning holes 41 are respectively provide in three corners of the substrate 26.

Subsequently, the four bus bars 30a to 30d are prepared whose respective front end portions are formed as the coupler terminals 31a to 31d. These bus bars 30a to 30d are produced by punching out the bus bars 30a to 30d from a conductive plate of Al or the like. During the production, simultaneously, multiple first tie bars 36, paired tabs 37, 37 and multiple second tie bars 38 are formed. The multiple first tie bars 36 are arranged in a linear manner to integrally connect the bus bars 30a to 30d together in an area close to the outer side edge of the substrate 26. The paired tabs 37, 37 are aligned with the first tie bars 36 in a liner manner, and protrude from the outer side surfaces of outermost bus bars 30a, 30d, respectively. The multiple second tie bars 38 are arranged in a linear manner to integrally connect the bus bars 30a to 30d together in an area close to the coupler terminals 31a to 31d. Thereafter, base end portions of these bus bars 30a to 30d are soldered to the bus bar connectors 33a to 33d placed in a corner potion of the substrate 26, respectively. Thereby, the assembly of the stator 25 is completed.

[2] Preparation for Formation of Covering Layer 32 (see FIGS. 11 to 14)

Figure 12A:
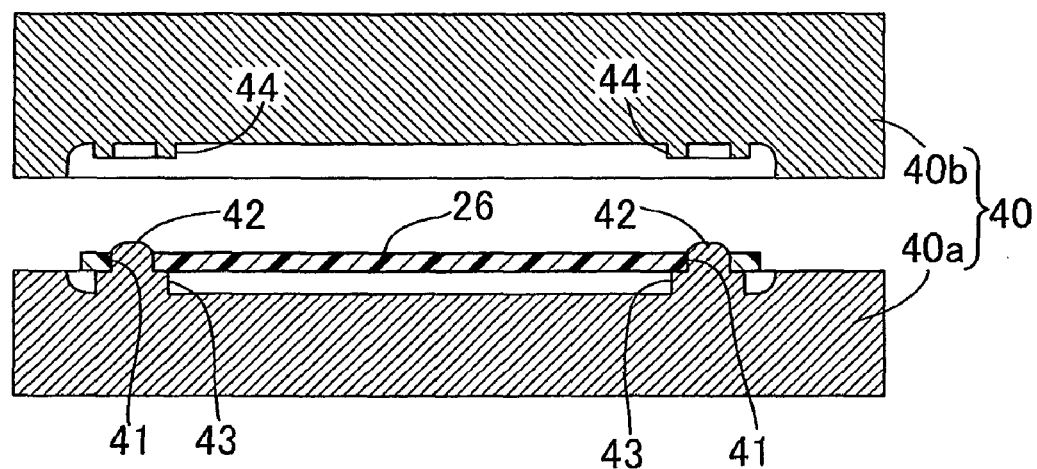
FIGS. 12A and 12B are cross-sectional views taken along line 12-12 in FIG. 11, FIG. 12A showing a state in which the die is opened, and FIG. 12B showing a state in which the die is closed.

As shown in FIGS. 11 and 12, the stator 25 is set between a stationary mold 40a and a movable mold 40b which form a covering layer molding die 40. Here, positioning pins 42 provided to the stationary mold 40a are respectively fitted into the positioning holes 41 provided in three corners of the substrate 26. In addition, a periphery of each positioning hole 41 is held between a corresponding one of pressing bosses 43 provided in the stationary mold 40a and the corresponding pressing boss 44 provided in the movable mold 40b.

Figure 13A:
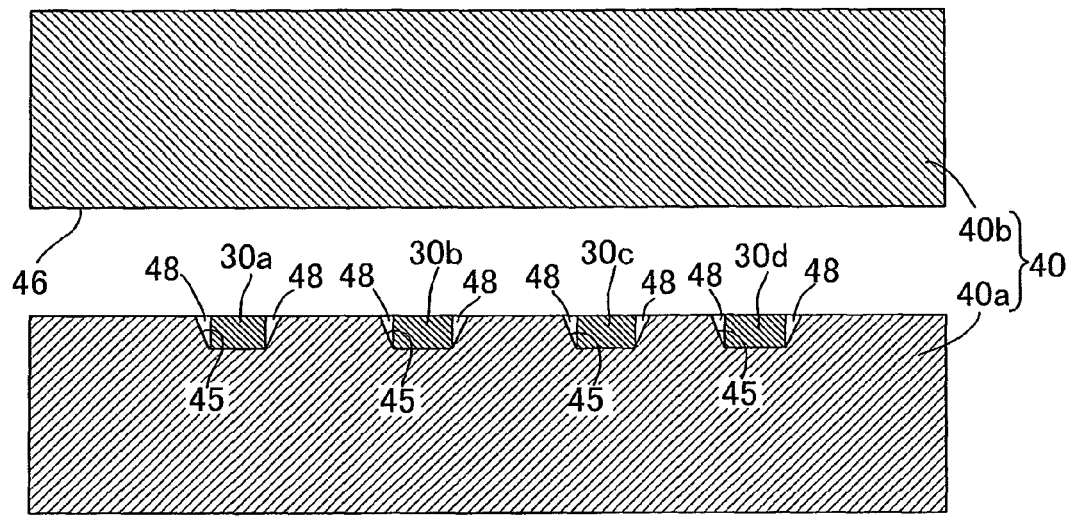
FIGS. 13A and 13B are cross-sectional views taken along line 13-13 in FIG. 11, FIG. 13A showing a state in which the die is opened, and FIG. 13B showing a state in which the die is closed.
Figure 13B:
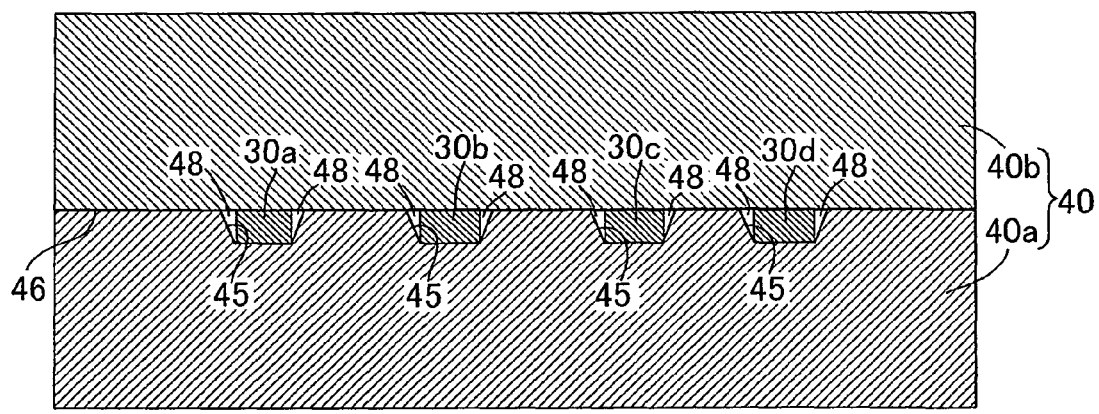
Figure 14A:
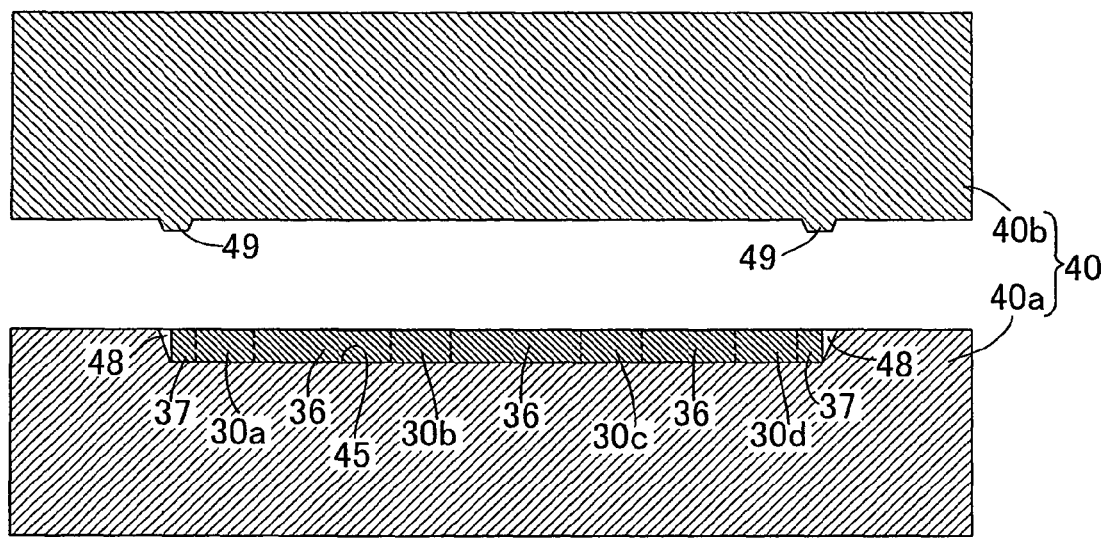
FIGS. 14A and 14B are cross-sectional views taken along line 14-14 in FIG. 11, FIG. 14A showing a state in which the die is opened, and FIG. 14B showing a state in which the die is closed.
Figure 14B:
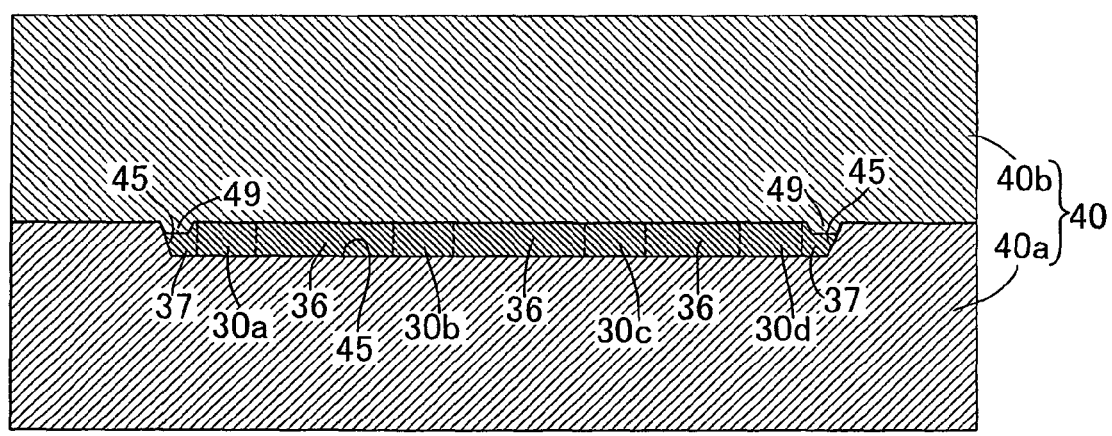
Figure 15:
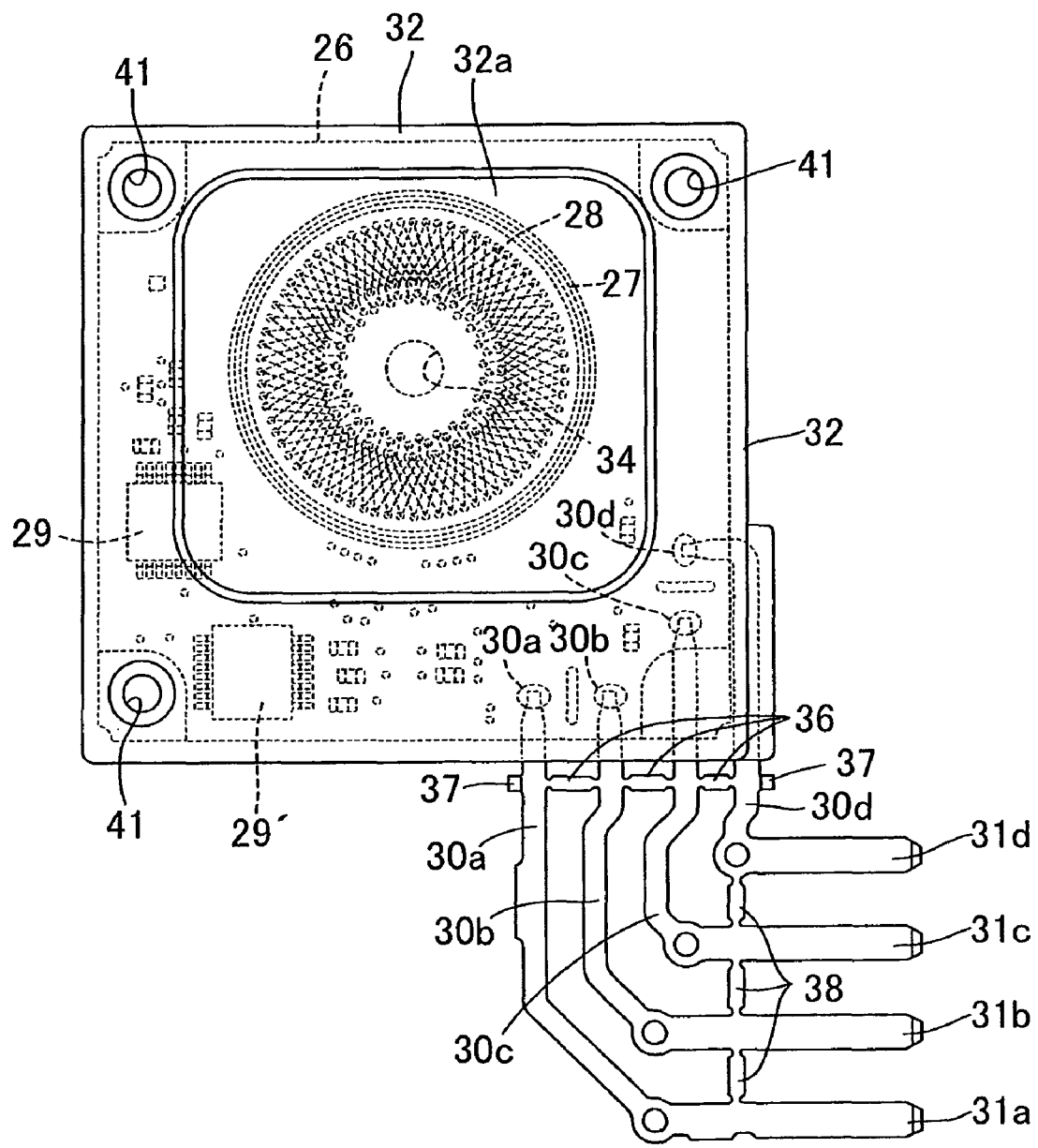
FIG. 15 is a plan view of the stator immediately after molding of the covering layer.

On the other hand, as shown in FIGS. 11, 13 and 14, the four bus bars 30a to 30d, the tabs 37, 37 as well as the first and second tie bars 36, 38, which all protrude from the substrate 26, are housed in holding grooves 45 provided in the stationary mold 40a, and are pressed toward groove bottoms of the respective holding grooves 45 by a pressing surface 46 of the movable mold 40b. Thereby, respective undersurfaces of the bus bars 30a to 30d, the tabs 37, 37 as well as the first and second tie bars 36, 38 are brought into intimate contact with the stationary mold 40a, whereas respective front surfaces thereof are brought into intimate contact with the movable mold 40b.

Two inner side surfaces of each holding groove 45 of the stationary mold 40a tilt in a way that the groove 45 becomes wider toward the outside. These tilts are for facilitating the housing and positioning of the bus bars 30a to 30d and the tabs 37, 37. As a result, a gap 48 is formed between the tilted inner side surfaces of each holding groove 45 and the outer side surface of the corresponding one of the bus bars 30a to 30d and the tabs 37, 37. On the other hand, protrusions 49, 49 protruding toward the holding grooves 45 are formed in areas in the movable mold 40b which correspond to the tabs 37, 37, respectively. Accordingly, when the stationary and movable molds 40a, 40b are closed, these protrusions 49, 49 crush the respective tabs 37, 37 thereby burying the gaps 48 between the outer side surfaces of each of the tabs 37, 37 and the tilted inner side surfaces of the holding groove 45 adjacent thereto (see FIG. 14B).

Figure 12B:
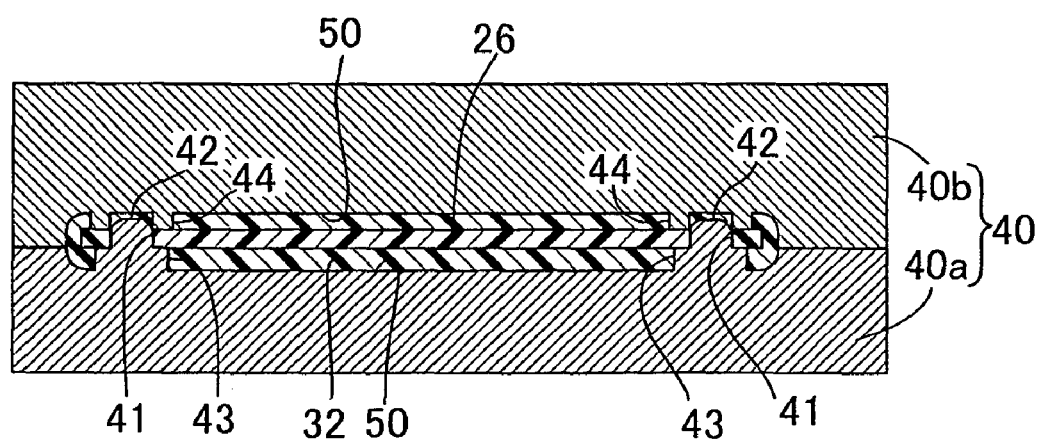

[3] Formation of Covering layer 32 by Molding (see FIG. 12B)

When the stationary mold 40a and the movable mold 40b are closed as described above, a cavity 50 is formed in which both front and back surfaces as well as the periphery of the substrate 26, the magnetic conductor 27, the receiving conductor 28, and the microcomputers 29, 29' are situated. A portion of the cavity 50 corresponding to the magnetic conductor 27 and the receiving conductor 28 is formed to be shallower in depth than the rest of the cavity 50. The thermosetting resin is filled into the cavity 50 from an unillustrated gate. This makes it possible to form the thermosetting-resin covering layer 32 around the substrate 26 and fill the through-hole 34 of the substrate 26 with the thermosetting resin. Additionally, the portion of the covering layer 32 covering the magnetic conductor 27 and the receiving conductor 28 is formed as the thin thickness part 32a (see FIG. 4) thinner in thickness than a remaining portion of the covering layer 32.

Here, the thermosetting resin filled into the cavity 50 flows outs to the gaps 48 between the outer side surfaces of the base of each of the bus bars 30a to 30d and the inner side surfaces of the corresponding holding groove 45 as molding flashes. However, the thermosetting resin flowing out to the gaps 48 in the base of each of the bus bars 30a to 30d can be blocked by the tabs 37, 37 and the first tie bars 36. That is because: these bus bars 30a to 30d are integrally connected together by the first tie bars 36; and the tabs 37, 37 aligned with the first tie bars 36 at the respective outermost sides, are crushed as described above thereby plugging the gaps at the respective two sides of each of the tabs 37, 37. Accordingly, it is possible to prevent the thermosetting resin from flowing out beyond the first tie bars 36, and to keep the formation of molding flashes to a minimum.

Figure 6:
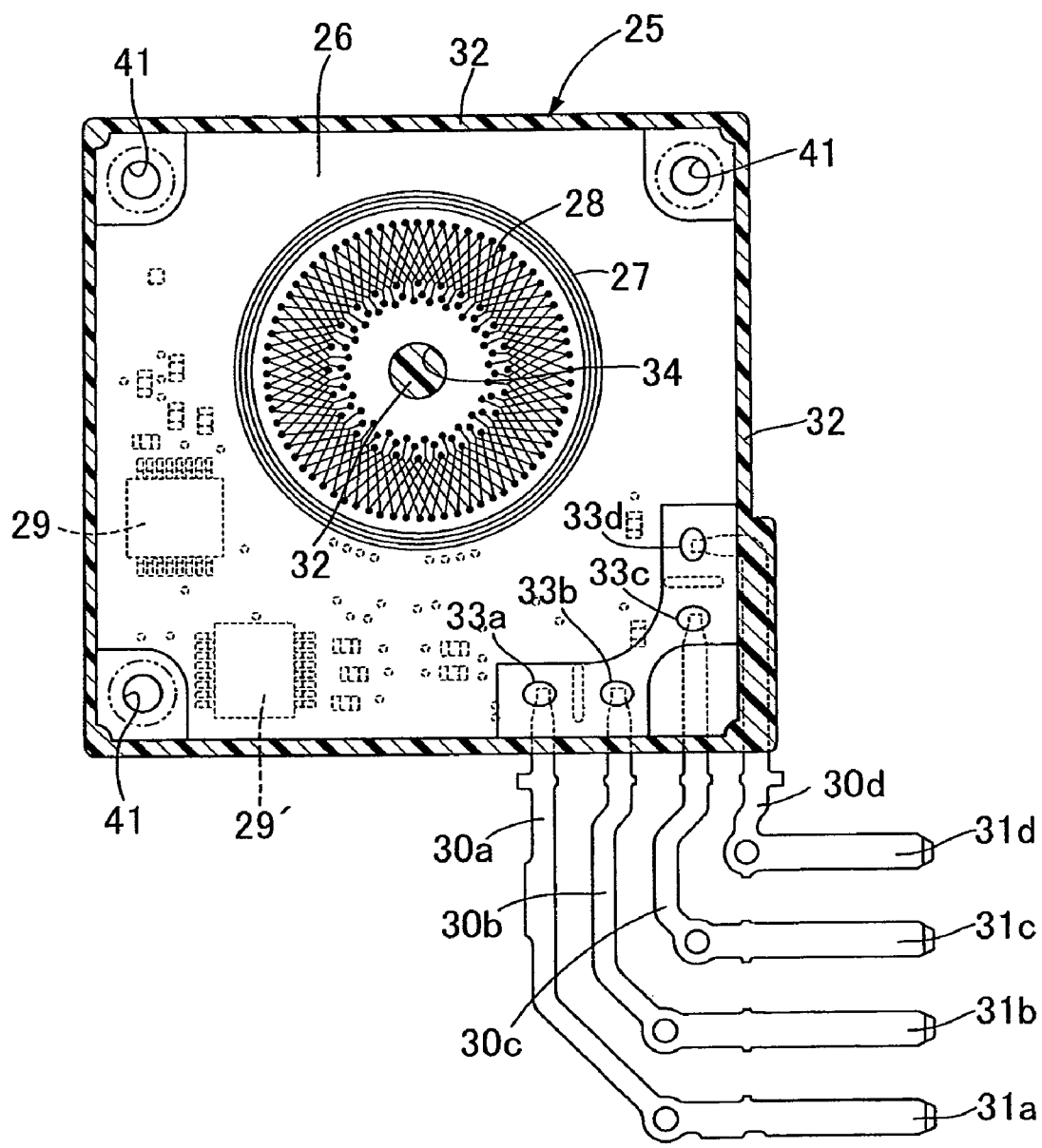
FIG. 6 is a plan view showing a stator in FIG. 3 with a covering layer being removed.
Figure 7:
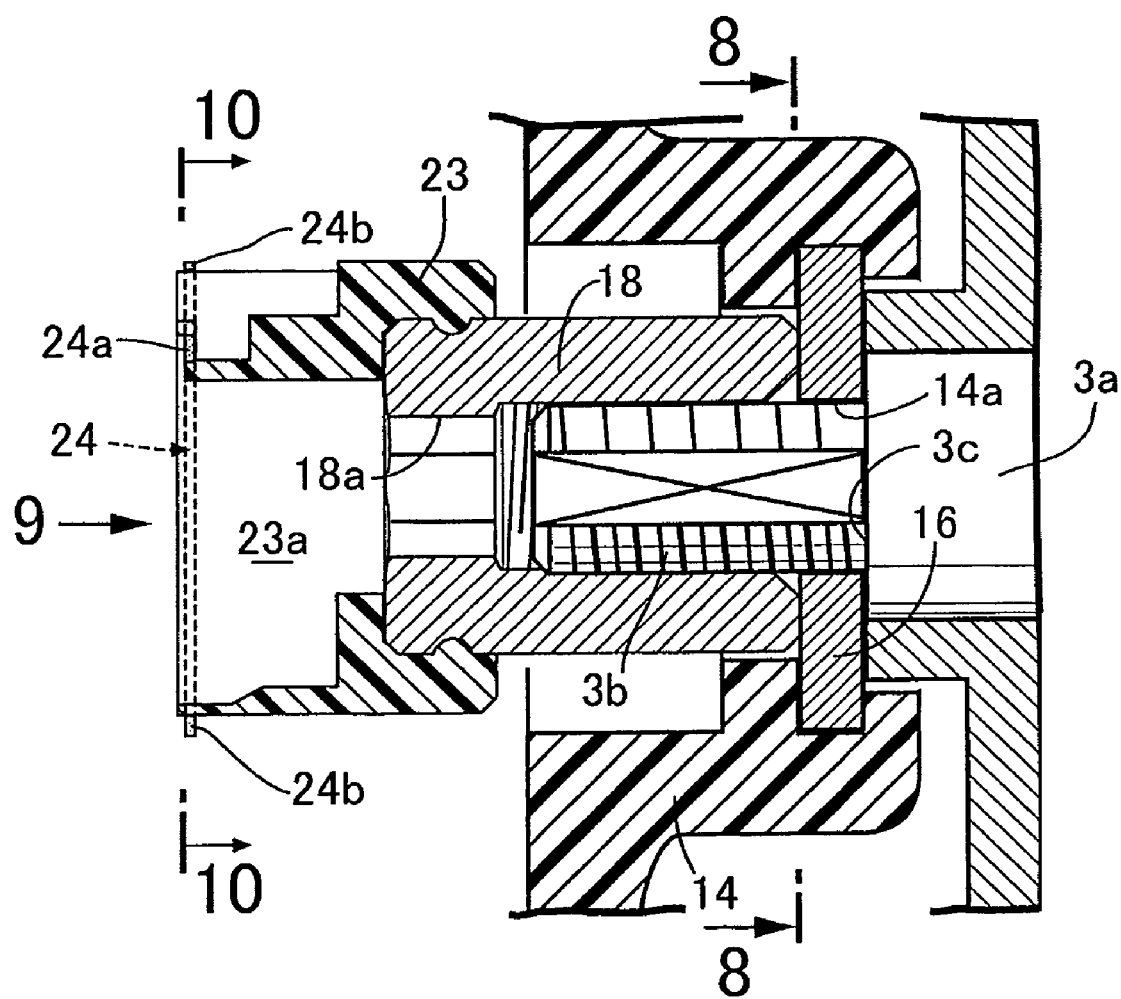
FIG. 7 is an enlarged view of a surrounding portion of a rotor in FIG. 1.
Figure 8:
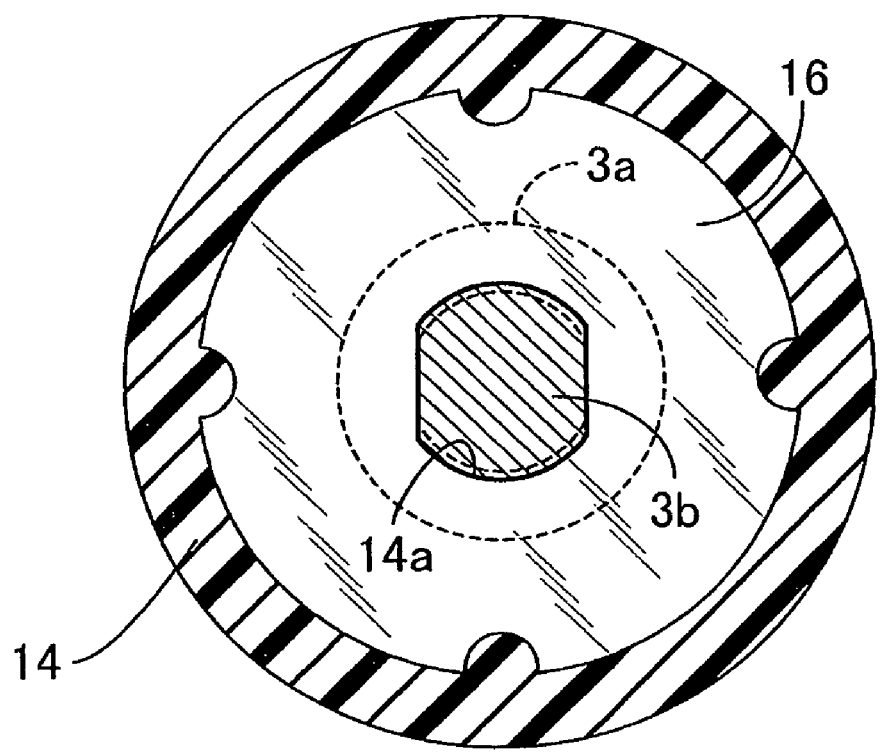
FIG. 8 is a cross-sectional view taken along line 8-8 in FIG. 7.

[4] Cutting off First and Second Tie Bars 36, 38 (See FIG. 6)

After the covering layer 32 is formed, the stationary mold 40a and the movable mold 40b are opened, and the stator 25 is taken out. Subsequently, the first and second tie bars 36, 38 connecting the bus bars 30a to 30d together are cut off by pressing. Thereby, the bus bars 30a to 30d are isolated from each other, and the production of the stator 25 is completed.

Figure 3:
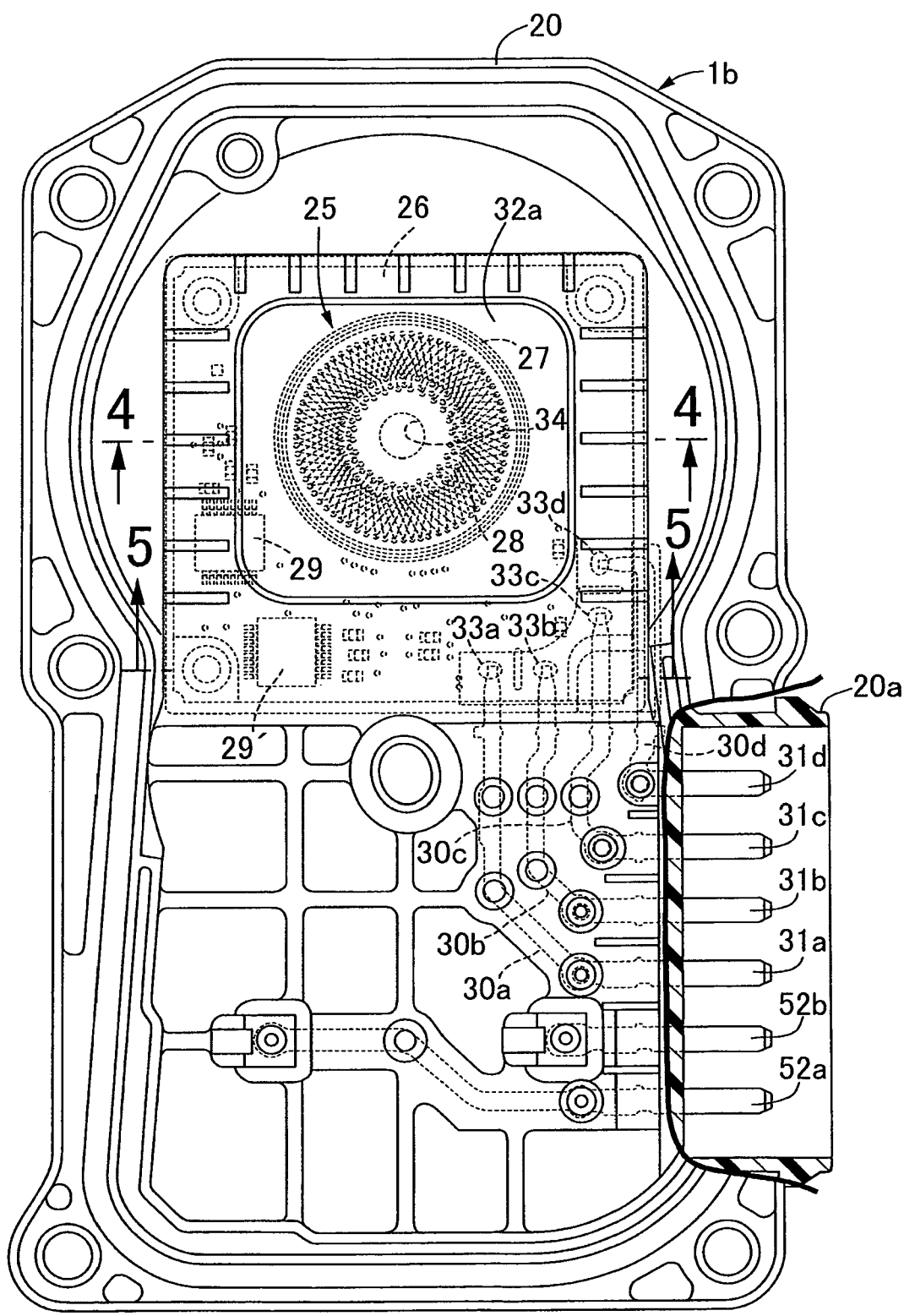
FIG. 3 is a side view inside of a housing cover of a control housing inside in FIG. 1.
Figure 4:
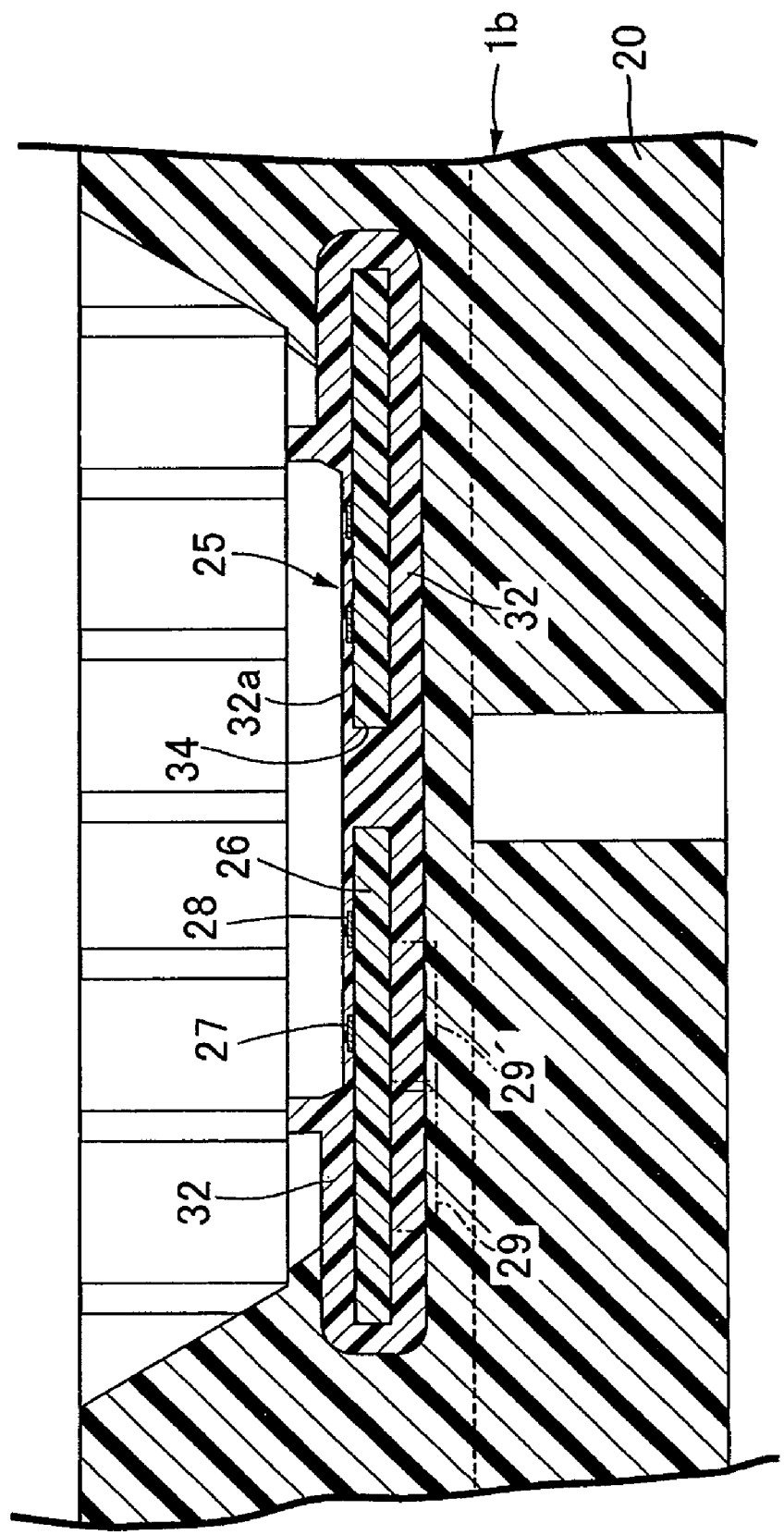
FIG. 4 is a cross-sectional view taken along line 4-4 in FIG. 3.
Figure 5:
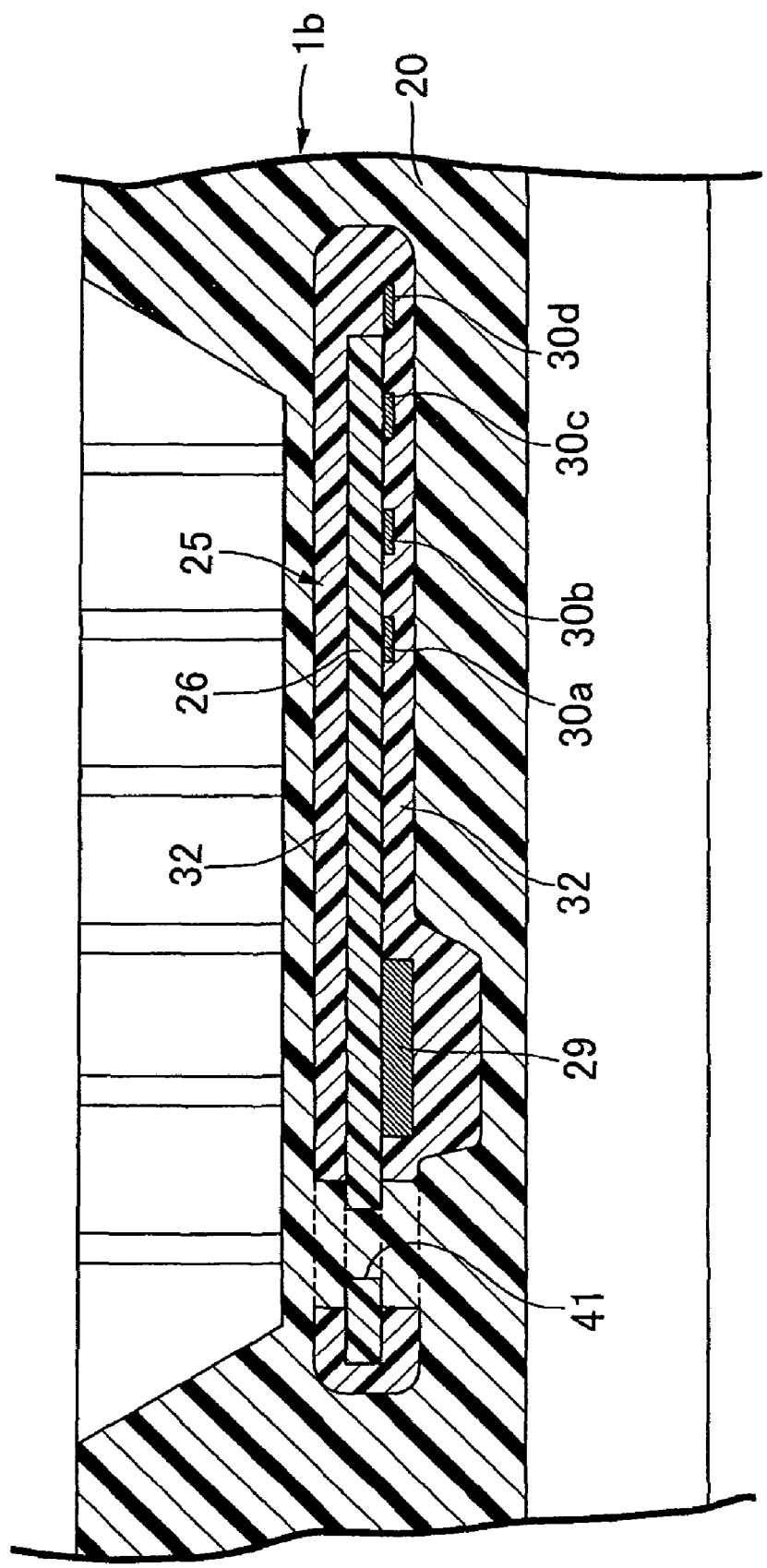
FIG. 5 is a cross-sectional view taken along line 5-5 in FIG. 3.

[5] Formation of Housing Cover 20 by Molding (see FIGS. 3 and 4)

When the housing cover 20 is formed of thermoplastic resin by molding, the stator 25 is set in a molding die (not illustrated) for the housing cover 20. In this respect, the thin thickness part 32a of the covering cover 32 covering the magnetic conductor 27 and the receiving conductor 28 is placed outside a cavity for molding the housing cover. The housing cover 20 is formed of the thermoplastic resin by molding in this manner. Thereby, it is possible to bury the stator 25 in the housing cover 20 having the coupler 20a while exposing the thin thickness part 32a from the inner side surface of the housing cover 20. In addition, it is possible to cause the coupler 20a to hold the four coupler terminals 31a to 31d for the inductance-type rotation angle sensor 22 and the two coupler terminals 52a, 52b for the electric motor 8.

Figure 16:
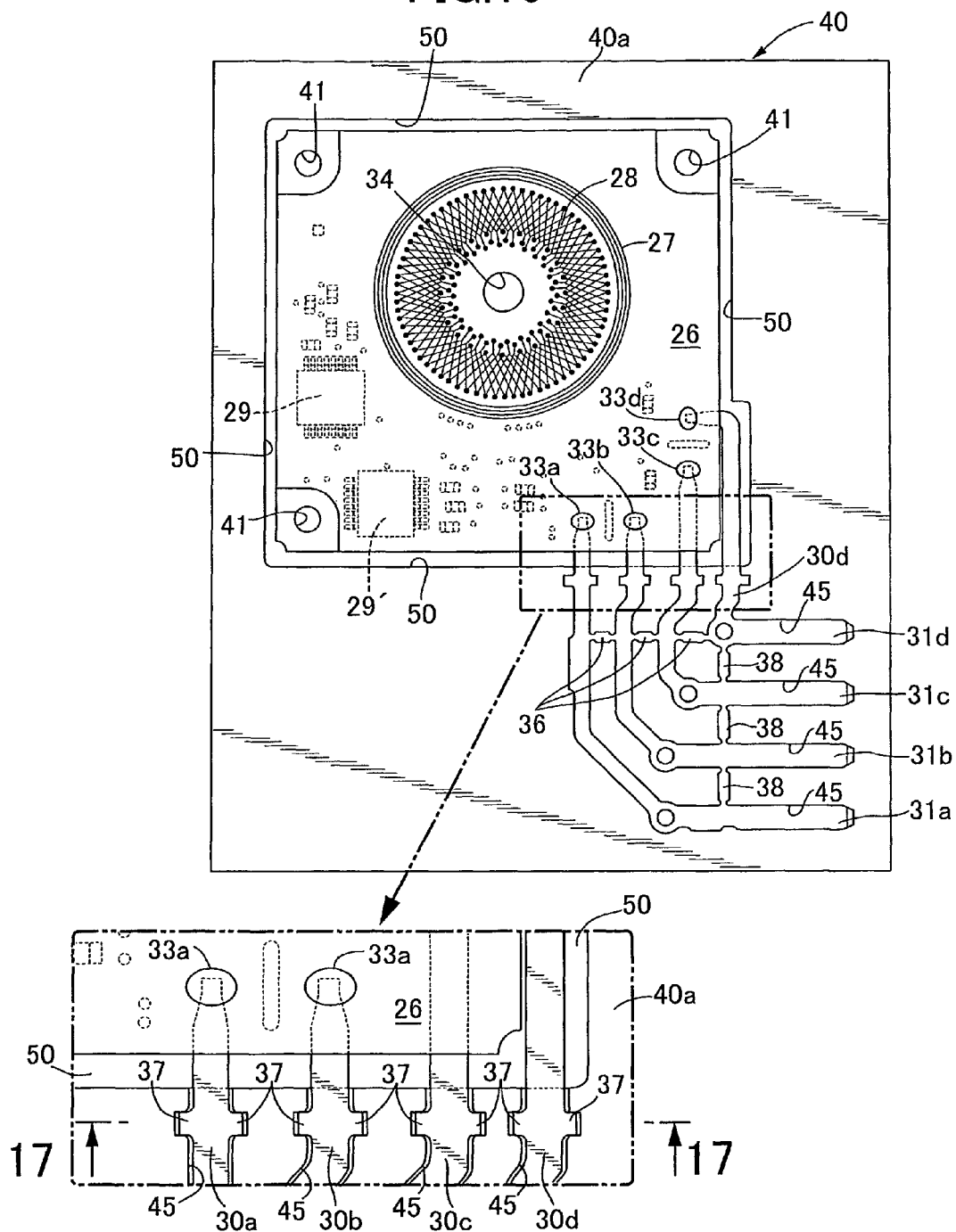
FIG. 16 is a view showing another method to mold a covering layer to a stator and corresponding to FIG. 11.
Figure 17A:
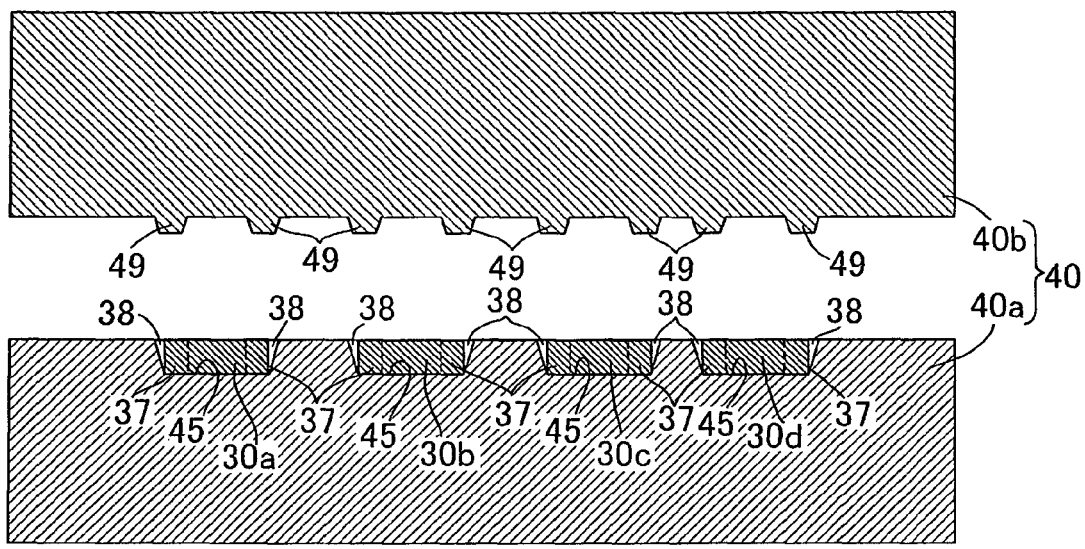
FIGS. 17A and 17B are cross-sectional views taken along line 17-17 in FIG. 16, FIG. 17A showing a state in which a die is opened, and FIG. 17B showing a state in which the die is closed.
Figure 17B:
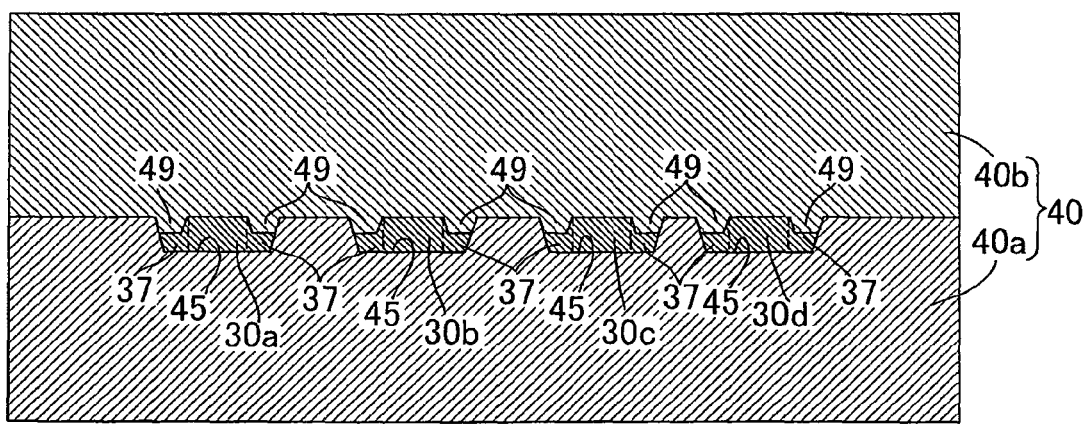

Next, descriptions will be made on a different embodiment of the present invention which is shown in FIGS. 16 and 17.

This different embodiment is different from the foregoing embodiment in terms of a method of blocking the thermosetting resin flowing out from the cavity 50 to the holding grooves 45. Specifically, instead of the first tie bars 36, paired tabs 37, 37 are formed in each of the multiple bus bars 30a to 30d. The paired tabs 37, 37 respectively protrude from the outer side surfaces of each bus bar. Meanwhile, multiple protrusions 49 which protrude toward their corresponding holding grooves 45 are formed in areas of the movable mold 40b of the covering layer molding die 40, the areas corresponding to the tabs 37, 37. When the stationary and movable molds 40a, 40b are closed, the protrusions 49 crush the respective tabs 37 thereby burying the gap between each of the tabs 37, 37 and the tilted inner side surfaces of the holding groove 45 adjacent thereto. Thus, it is possible for the tabs 37, 37 to block the thermosetting resin flowing out from the cavity 50 to the gaps 48 in the bases of the bus bars 30a to 30d when the thermosetting resin is filled into the cavity 50. Accordingly, it is possible to keep the formation of molding flashes to a minimum. The rest of the configuration is the same as that according to the foregoing embodiment. For this reason, in FIGS, 16 and 17, parts corresponding to those according to the foregoing embodiment are denoted by the same reference numerals, and duplicative descriptions are omitted.

The present invention is not limited to the above-described embodiments. Various design modifications can be made within a scope not departing from the gist of the present invention. For instance, the present invention can be applied to any sensor configured to detect change in the rotation angle of a rotary body other than the throttle opening-degree sensor 22. Further, it is possible to use a cap-type nut having an outer end with which a cross-shaped groove is engaged instead of using the nut 18 having the polygonal socket 18a.

The invention claimed is:

1. An inductance-type rotation angle sensor including a rotor attached to a rotating body to be detected and a stator attached to an irrotational control housing,
   the stator formed by printing an annularly formed magnetic conductor and a receiving conductor placed adjacent to the magnetic conductor on a glass-epoxy-resin substrate,
   the rotor having an excitation conductor attached thereto in a manner opposing the magnetic conductor,
   the sensor being configured to detect from the receiving conductor change in inductance of the magnetic conductor due to rotation of the excitation conductor as change in a rotation angle of the rotating body, wherein
   a thermosetting-resin covering layer is formed on both front and back surfaces of the substrate by molding, the covering layer on the front and back surfaces of the substrate connected together through a periphery of the substrate and a through-hole included in the substrate,
   a portion of the covering layer covering the magnetic conductor and the receiving conductor is formed as a thin thickness part which is thinner in thickness than a remaining portion of the covering layer, and
   the stator is buried in the thermoplastic-resin control housing with the thin thickness part being exposed to an outside.

2. The inductance-type rotation angle sensor according to claim 1, wherein the covering layer is formed of a thermosetting resin whose coefficient of linear expansion is smaller than that of the substrate in its plate-thickness direction.

3. The inductance-type rotation angle sensor according to claim 1, wherein
   a plurality of bus bars are respectively connected to bus bar connectors on the substrate, the bus bars having coupler terminals formed at one end parts, respectively,
   the bus bar connectors are buried in the covering layer, and
   a coupler configured to hold the coupler terminals is formed integrally in the control housing.

4. A method of manufacturing the inductance-type rotation angle sensor according to claim 1, wherein
   when the thermosetting-resin covering layer covering both the front and back surfaces of the substrate is formed by setting the stator between a stationary mold and a movable mold for forming a covering layer, and by subsequently filling a thermosetting resin into a cavity formed between the stationary mold and the movable mold,
   integrally connecting the plurality of bus bars together by tie bars in an area close to an outer side edge of the substrate while forming tabs respectively in outermost bus bars, the tabs being aligned with the tie bars and protruding laterally outward;
   forming holding grooves configured to loosely accommodate the bus bars, the tie bars and the tabs in one of the stationary mold and the movable mold;
   when the stationary mold and the movable mold are closed with the stator being set between the two molds,
   bringing the two molds into intimate contact with the respective both surfaces of each of the bus bars and the tie bars, and crushing the tabs to fill in gaps between the tabs and inner side surfaces of holding grooves opposed to the tabs, respectively; and
   subsequently, when the thermosetting resin is filled into the cavity, blocking the resin from flowing out from the cavity to the holding grooves by the tie bars and the tabs.

5. A method of manufacturing the inductance-type rotation angle sensor according to claim 1, wherein
   when the thermosetting-resin covering layer covering both the front and back surfaces of the substrate is formed by setting the stator between a stationary mold and a movable mold for forming a covering layer, and by subsequently filling a thermosetting resin into a cavity formed between the stationary mold and the movable mold,
   providing paired tabs to outer side surfaces of each of the plurality of bus bars in an area close to an outer side edge of the substrate in a manner protruding in a direction in which these bus bars are arranged side by side, while forming holding grooves configured to loosely accommodate the bus bars and the tabs in one of the stationary mold and the movable mold;
   when the stationary mold and the movable mold are closed with the stator being set between the two molds,
   bringing the two molds into intimate contact with the respective both surfaces of each of the bus bars, and crushing the tabs to fill in gaps between the tabs and inner side surfaces of the holding grooves, respectively; and
   subsequently, when the thermosetting resin is filled into the cavity, blocking the resin from flowing out from the cavity to the holding grooves by the tabs.

6. An intake control system for an engine which is equipped with an inductance-type rotation angle sensor, the system comprising:

a throttle body including an intake barrel having an intake passage, the intake barrel supporting a valve shaft of a throttle valve for opening and closing the intake passage, and the control housing continuously provided to a side of the intake barrel;

an electric motor housed in the control housing and configured to drive the throttle valve to open and close;

a deceleration gear mechanism configured to transmit a rotation of the electric motor to the valve shaft while reducing a speed of the rotation; and a throttle opening-degree sensor configured to detect an opening-degree of the throttle valve, in which the throttle opening-degree sensor is configured of the inductance-type rotation angle sensor according to claim 1, wherein a final follower gear of the deceleration gear mechanism is fixed to an end portion of the valve shaft by a nut screwed to the end portion, a tool engagement part configured to engage with a tool for turning the nut is formed in an outer end portion of the nut, the rotor is fixed to an outer periphery of the outer end portion of the nut, the rotor made of a synthetic resin and having a tubular shape with a hollow part for enabling insertion and removal of the tool, the excitation conductor is attached to an end portion of the rotor, the stator is fixed to the control housing in a manner opposing to the rotor with a gap therebetween, and configured to detect an opening-degree of the throttle valve in cooperation with the rotor, and the rotation angle sensor is formed of the rotor, the excitation conductor and the stator.

7. The intake control system for an engine which is equipped with the inductance-type rotation angle sensor according to claim 6, wherein the nut and the excitation conductor are buried in and connected to opposite end portions of the rotor, respectively, so that the nut, the excitation conductor, and the rotor are constructed as a single part.

* * * * *